(12) United States Patent
Spence et al.

(10) Patent No.: US 9,837,787 B2
(45) Date of Patent: Dec. 5, 2017

(54) METHOD AND A SYSTEM FOR GENERATING A RAMAN SECOND STOKES LIGHT TO A SOURCE LIGHT

(71) Applicant: Macquarie University, North Ryde, New South Wales (AU)

(72) Inventors: David James Spence, Forestville (AU); David Coutts, Baulkham Hills (AU); Richard Paul Mildren, Abbotsford (AU); Helen Margaret Pask, Seaforth (AU); Jipeng Lin, Meadowbank (AU); Aravindan Warrier, Sydney (AU)

(73) Assignee: MACQUARIE UNIVERSITY, New South Wales (AU)

( * ) Notice: Subject to any disclaimer, the term of this patent is extended or adjusted under 35 U.S.C. 154(b) by 0 days.

(21) Appl. No.: 15/039,196

(22) PCT Filed: Nov. 27, 2014

(86) PCT No.: PCT/AU2014/001078
§ 371 (c)(1),
(2) Date: May 25, 2016

(87) PCT Pub. No.: WO2015/077823
PCT Pub. Date: Jun. 4, 2015

(65) Prior Publication Data
US 2017/0163004 A1    Jun. 8, 2017

(30) Foreign Application Priority Data
Nov. 28, 2013    (AU) ................. 2013904611

(51) Int. Cl.
*H01S 3/30* (2006.01)
*H01S 3/094* (2006.01)
(Continued)

(52) U.S. Cl.
CPC .............. *H01S 3/30* (2013.01); *H01S 3/083* (2013.01); *H01S 3/0816* (2013.01); *H01S 3/094026* (2013.01); *H01S 3/1086* (2013.01)

(58) Field of Classification Search
CPC .......... H01S 3/30; H01S 3/0816; H01S 3/083; H01S 3/094026; H01S 3/1086
See application file for complete search history.

(56) References Cited

U.S. PATENT DOCUMENTS

| | | |
|---|---|---|
| 5,696,778 A | 12/1997 | MacPherson |
| 2005/0163169 A1 | 7/2005 | Lawandy et al. |

OTHER PUBLICATIONS

Basiev, T.T. et al. "Parametric coupling of frequency components at stimulated Raman scattering in solids" Physics-Uspekhi vol. 53, No. 6 (2010).
(Continued)

*Primary Examiner* — Armando Rodriguez
(74) *Attorney, Agent, or Firm* — Caesar Rivise, PC

(57) ABSTRACT

A method and system for generating a Raman second Stokes light to a source light comprising generating a Raman first Stokes light from the source light by a Raman interaction in a nonlinear optical medium disposed in an optical resonator, and resonating the Raman first Stokes light in the optical resonator; generating a seed light at the frequency of the Raman second Stokes light from the source light and the Raman first Stokes light by a four wave mixing process which is not phase matched in the nonlinear medium; amplifying the seed light by transferring power from the first Stokes light resonating in the optical resonator to the seed light using a Raman amplification process in the nonlinear medium; and extracting from the optical resonator a majority of the power of the seed light so amplified.

19 Claims, 2 Drawing Sheets

(51) Int. Cl.
*H01S 3/081* (2006.01)
*H01S 3/083* (2006.01)
*H01S 3/108* (2006.01)

(56) References Cited

OTHER PUBLICATIONS

International Search Report of PCT/AU2014/001078 mailed Jan. 29, 2015.
McKay, A. et al "An efficient 14.5 W diamond Raman laser at high pulse repetition rate with first (1240 nm) and second (1485nm) Stokes output." Laser Physics Letters Abstract, p. 2, col. 2, p. 3, col. 1, Figs 1-3.
Basiev T.T et al. "Multi-wave SRS oscillation in PbMoO4 and PbMo0.5W0.5O4 crystals under 18 picosecond laser pumping" Laser Physics Letters vol. 9, No. 12 (Dec. 19, 2012): 853-857 abstract, p. 855, col. 1.
Basiev, T.T. et al. "Parametric coupling of frequency components at stimulated Raman scattering in solids" Physics-Uspekhi vol. 53, No. 6 (2010); 611-617. abstract, section 2: p. 612-614.
S.N. Smetanin et al. SRS generation under phase matching conditions for four-wave interactions of SRS components in birefringent Raman-active crystals.
European Search Report for corresponding European Patent Application No. 14866055.8 dated Jul. 12, 2017.
McKay, A. et al. "An efficient 14.5 W diamond Raman laser at high pulse repetition rate with first (1240 nm) and second (1485 nm) Stokes output." Laser Physics Letters. (Aug. 2013), pp. 1-4.
Basiev T.T. et al., "Multi-wave SRS oscillation in PbMoO4 and PbMo0.5W0.5O4 crystals under 18 picosecond laser pumping." Laser Physics Letters, vol. 9, No. 12 (Dec. 19, 2012): pp. 853-857.
Basiev, T.T. et al. "Parametric coupling of frequency components at stimulated Raman scattering in solids." Physics-Uspekhi vol. 53, No. 6 (2010); 611-617, abstract, section 2: pp. 611-617.
S.N. Smetanin et al. SRS generation under phase matching conditions for four-wave interactions of SRS components in birefringent Raman-active crystals, Optics and Spectroscopy, Jun. 2013, vol. 114, Issue 6, Abstract, pp. 813-814 and References.

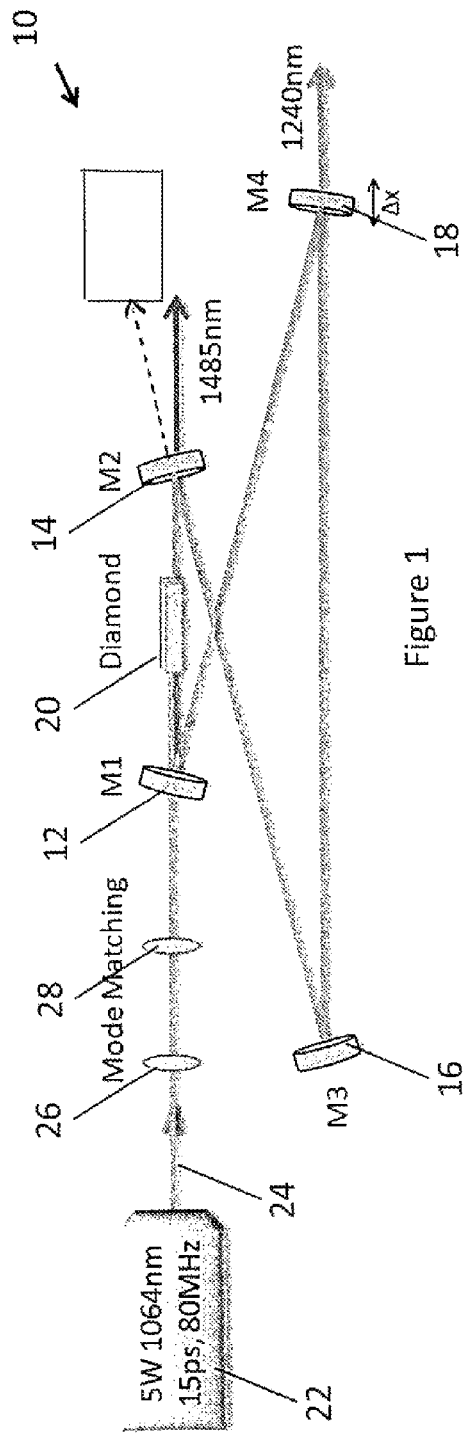
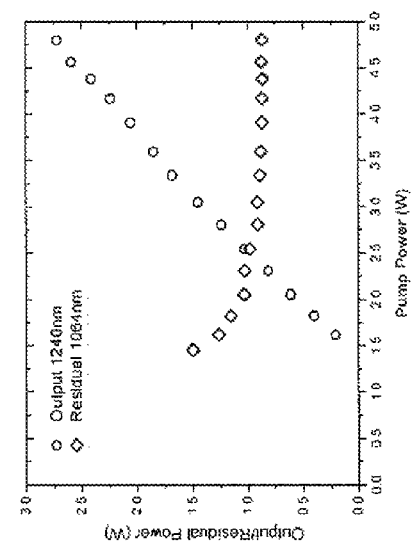
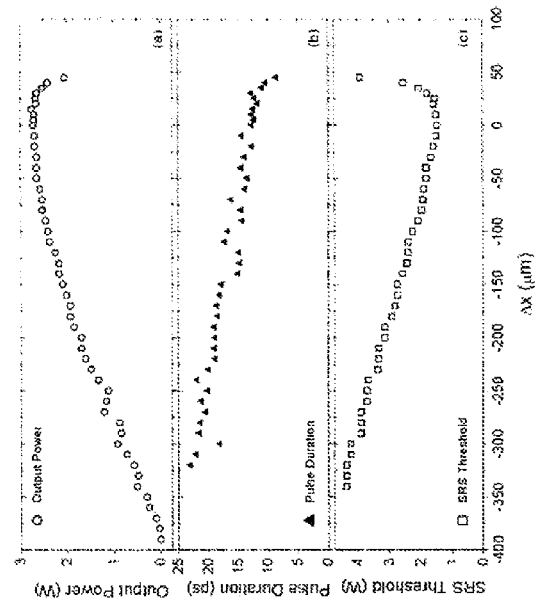
Figure 1
Figure 3
Figure 2

METHOD AND A SYSTEM FOR GENERATING A RAMAN SECOND STOKES LIGHT TO A SOURCE LIGHT

CROSS REFERENCE TO RELATED APPLICATIONS

This United States national phase application claims the benefit under 35 U.S.C. §371 of PCT Application No. PCT/AU2014/001078 filed on Nov. 27, 2014, which in turn claims priority to Australian Serial No. 2013904611 filed on Nov. 28, 2013 and all of whose entire disclosures are incorporated by reference herein

FIELD OF INVENTION

The disclosure herein generally relates to a method and a system for generating a Raman second stokes light to a source light.

BACKGROUND OF INVENTION

Stimulated Raman scattering (SRS) has been used to generate light at frequencies for which it is difficult, inconvenient or impractical to generate using common and/or practical lasers.

In some circumstances however, the performance of systems exploiting SRS may be less than desirable or practical, especially but not exclusively when the light comprises pulses of light of temporal width of around 1 n or less. Some light may not be generated using existing systems exploiting SRS.

SUMMARY OF INVENTION

Disclosed herein is a method for generating a Raman second Stokes light to a source light. The method comprises the step of generating a Raman first Stokes light from the source light by a Raman interaction in a nonlinear optical medium disposed in an optical resonator, and resonating the Raman first Stokes light in the optical resonator. The method comprises the step of generating a seed light at the frequency of the Raman second Stokes light from the source light and the Raman first Stokes light by a four wave mixing process which is not phase matched in the nonlinear optical medium. The method comprises the step of amplifying the seed light by transferring power from the first Stokes light resonating in the optical resonator to the seed light using a Raman amplification process in the nonlinear medium. The method comprising the step of extracting from the optical resonator a majority of the power of the seed light so amplified. Resonating the first Stokes and using a four wave mixing process may greatly lower the threshold for generation of the Raman second Stokes light. Extracting the majority of the power of the seed light so amplified may relax the need for compensating the chromatic dispersion introduced by the nonlinear optical medium and optical resonator, which may be a substantial simplification.

In the context of this document, a nonlinear optical medium is an optical medium that has a nonlinear response to the power of light therein.

In an embodiment, the method comprises the step of generating the source light external of the resonator. Alternatively, the method may comprise the step of generating the source light internal of the resonator. For example, the method may comprise generating the source light by a LASER ("light amplification by the stimulated emission of radiation") process internal of the resonator. Examples of LASER processes include but are not limited to an electronic LASER process and a Raman LASER process. Consequently, the source light may be one of a Raman Stokes—for example a Raman first Stokes, a Raman second Stokes, or a higher order Raman Stokes—of an original light. The original light may be generated by a LASER device external of the resonator, for example.

In an embodiment, the source light comprises a plurality of source light pulses. The Raman first Stokes light may comprise a plurality of Raman first Stokes light pulses. The seed light may comprise a plurality of Raman second stokes light pulses. The Raman second Stokes light may comprise a plurality of Raman second Stokes light pulses. The plurality of source light pulses may have a temporal width of less than at least one of 10 ns, 1 ns, 100 ps, 10 ps and 1 ps. The plurality of source light pulses may be spatially coincident with the plurality of Raman first Stokes pulses, the plurality of seed light pulses, and the plurality of Raman second Stokes light pulses within the nonlinear optical medium. A mode locked laser may generate the plurality of light source pulses.

The plurality of source light pulses, especially if generated by a mode locked laser, may have relatively high peak optical power, improving the response of the nonlinear optical medium.

In an embodiment, the nonlinear optical medium comprises a diamond crystal. Diamond generally has a relatively strong Raman response and has relatively good thermal properties. Alternatively, another suitable nonlinear optical medium may used, examples of which include but are not limited to $LiNbO_3$, KGW, $YVO_4$, $Ba(NO3)_2$, and $BaWO_4$.

In an embodiment, the source light, the Raman first Stokes light, and the seed light propagate in a <110> direction of the diamond crystal. The source light may be polarised in the <111> direction of the diamond crystal.

In an embodiment, the Raman first Stokes light may have a single sense of movement within the optical resonator. This may reduce optical losses and improve performance.

In an embodiment, resonating the Raman first Stokes light in the optical resonator comprises the step of losing less than at least one of 5%, 2%, 1% and 0.5% of the power of the Raman first Stokes light per resonance cycle. Generally, the loss of the Raman first Stokes light is low when the seed is generated. Increased loss of the Raman first Stokes light may be compensated for by increasing the source light power.

An embodiment comprises the step of extracting from the optical resonator at least one of 83%, 90%, 95%, 96%, 97%, 98%, 99%, and 100% of the power of the seed light so amplified.

Disclosed herein is a system for generating a Raman second Stokes light to a source light. The system comprises an optical resonator having disposed therein a nonlinear optical medium for receiving the source light, the optical resonator being configured to resonate a Raman first Stokes light generated by a Raman interaction of the source light when so received with the nonlinear medium, the nonlinear medium being able to support therein a four wave mixing process which is not phase matched involving the Raman first Stokes light when so generated and the source light, the four wave mixing process generating a seed light at the frequency of the Raman second Stokes light, the nonlinear medium being able to support therein a Raman amplification process that amplifies the seed light when so generated by transferring power from the Raman first Stokes light to the seed light. The system comprises a light extractor arranged to extract from the optical resonator a majority of the power of the seed light so amplified.

In an embodiment, the light extractor comprises at least one mirror that transmits a majority of the power of the seed light so amplified. Alternatively or additionally, for example, the light extractor may comprise a dispersive element. The light extractor may comprise several components that each extract from the optical resonator power of the seed light so amplified. Generally any suitable light extractor may be used.

An embodiment comprises a source arranged to generate the source light. The source may be arranged to generate a plurality of source light pulses. The Raman first Stokes light when so generated may comprise a plurality of Raman first Stokes light pulses. The seed light when so generated may comprise a plurality of seed light pulses. The Raman second Stokes light when so generated may comprise a plurality of Raman second light pulses.

In an embodiment, the source may be external of the resonator. The source and the resonator may be arranged such that the source light when so generated is received by the nonlinear optical medium. The source may, for example, comprise a LASER device. The LASER device may comprise at least one of a mode locked laser device, a Q-switched laser device, and a continuous wave laser device, for example.

In another embodiment, the resonator is configured for generation of the source light within the resonator. This other embodiment may comprise an original light source external of the resonator and arranged to generate an original light. The resonator may be configured for generation of the source light from the original light by a Raman interaction of the original light. The source light may, for example, be a Raman first Stokes, or high order Raman Stokes, of the original light.

In an embodiment, each of the plurality of source light pulses has a temporal width of less than at least one of 10 ns, 1 ns, 100 ps, 10 ps and 1 ps.

In an embodiment, the optical resonator has a length such that the plurality of source light pulses are spatially coincident with the plurality of Raman first Stokes pulses and the plurality of seed light pulses within the nonlinear optical medium.

In an embodiment, the source of the source light comprises a mode locked laser generating the plurality of source light pulses.

In an embodiment, the nonlinear optical medium comprises a diamond crystal. Generally, however, any suitable nonlinear optical medium may be used. The optical resonator and the diamond may be arranged such that the source light, the Raman first Stokes light, and the seed light propagate in a <110> direction of the diamond crystal. The source light may be polarised in the <111> direction of the diamond crystal.

In an embodiment, the optical resonator may not be linear. The optical resonator may comprise an optical ring resonator, for example a bow tie resonator or generally any suitable optical resonator. The resonator may be, however, linear.

In an embodiment, the optical resonator is configured for less than at least one of 5%, 2%, 1%, and 0.5% loss of the power of the Raman first stokes light per resonance cycle.

The light extractor may be arranged to extract from the optical resonator at least one of 83%, 90%, 95%, 96%, 97%, 98%, 99% and 100% of the power of the seed light so amplified.

Any of the various features of each of the above disclosures, and of the various features of the embodiments described below, can be combined as suitable and desired.

DESCRIPTION OF DRAWINGS

Embodiments will now be described by way of example only with reference to the accompanying figures in which:

FIG. 1 shows a schematic diagram of an embodiment of a system for generating a Raman second Stokes light to a source light.

FIG. 2 shows a first-Stokes threshold for the system of FIG. 1, output power and pulse duration as a function of optical resonator length detuning.

FIG. 3 shows power transfer data for no optical resonator length detuning.

DETAILED DESCRIPTION OF THE PREFERRED EMBODIMENTS

Figure 4:
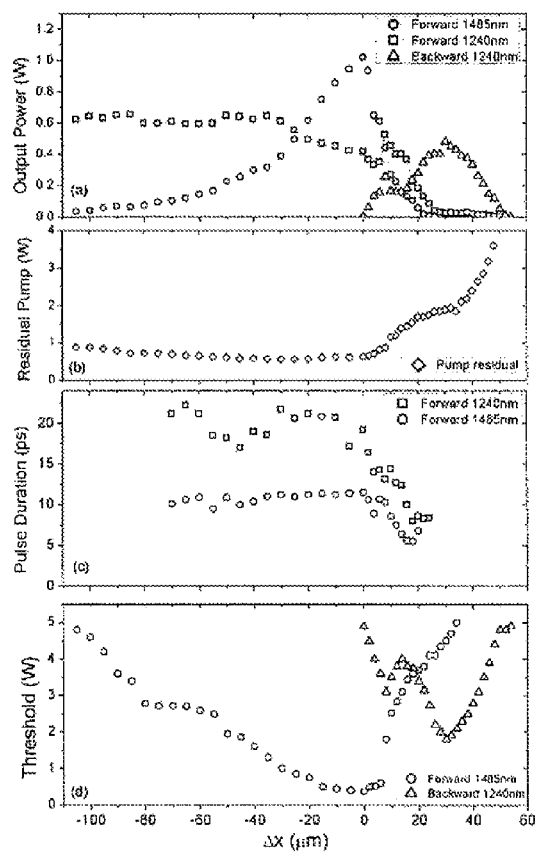
FIG. 4 shows performance of the system of FIG. 1 as a function of optical resonator length detuning.

FIG. 1 shows a schematic diagram of an embodiment of a system for generating a Raman second Stokes light to a source light 24, the system being generally indicated by the numeral 10. The system 10 has an optical resonator that is in this embodiment an optical ring resonator in the form of a bow tie shaped optical ring resonator comprising in this embodiment two curved mirrors 12, 14 (labelled M1 and M2, and having a radius of curvature ROC=200 mm) and two flat mirrors 16, 18 (M3 and M4). The specification for each of the dielectric coated mirrors is summarized in Table 1. Light is extracted from the resonator by at least one mirror ("output coupler"), which is at least partially transmissive. Light may be extracted using generally any suitable light extractor. Disposed in the resonator is a nonlinear optical medium 20 that can support both Raman and four wave mixing interactions.

TABLE 1

Summary of mirror coatings.

| Mirror | 1064 nm | 1240 nm | 1480 nm |
|---|---|---|---|
| M1, M3 | T = 93% | R > 99.99% | T = 90% |
| M2 | — | T = 0.4% | T = 91% |
| M4$_1$ | — | T = 8.3% | — |
| M4$_2$ | — | R > 99.99% | T = 85% |

In this embodiment, the nonlinear optical medium is a crystal in the form of a diamond crystal. The diamond crystal in this but not necessarily in all embodiments is a CVD-grown diamond. Diamond was chosen for its high Raman gain coefficient ($g_R$~15 cm/GW for 1064 nm). Diamond also has outstanding thermal mechanical properties that enable efficient Raman conversion for high power operation and an unusually large Raman shift of 1332 cm$^{-1}$. The 8 mm-long rectangular diamond crystal, with an anti-reflective coating at 1240 nm (reflectivity R=0.06% per pass for each end-face), is oriented such that a source light ("pump beam" or "pump light") propagates along the <110> axis and is polarized along the <111> axis in order to access the maximum Raman gain of the diamond crystal. Generally, however, any suitable nonlinear medium may be used in any suitable orientation with or without suitable coatings. An example of a suitable material is KGW. A source of the source light in the form of a mode-locked Nd:YVO$_4$ laser (*Spectra Physics Vanguard* 2000-HM532) generated up to 4.8 W of average power at 1064 nm with pulse duration of 15 ps and repetition rate of 80 MHz. The incident power of the source light can be attenuated by using a half-waveplate and a polarizer beam-splitting cube without otherwise changing the operating characteristics of the pump laser. Two plano-convex lenses 26, 28 ($f_1$=500 mm and $f_2$=200 mm) are used to focus the source light through the input mirror M1 into the centre of the diamond crystal with a focal spot size $p_p$=22 μm.

While the system has a surprisingly simple configuration for and is surprisingly efficient in generating a Raman second Stokes light ("second Stokes") to the source light, the system may also be adapted to radiate a beam of a Raman first Stokes light ("first Stokes") to the source light, providing a degree of wavelength agility. The configuration is effected, in this but not necessarily in all embodiments, by selecting between different M4 mirrors 18 (M4$_1$ and M4$_2$).

For extracting the first-Stokes, the majority of the output power was obtained from M4$_1$ (having transmission T=8.3% at 1240 nm) while M2 (T=0.4% at 1240 nm) also leaked a small amount output power. For second-Stokes extraction, M4$_2$ (having reflectivity of R>99.99% at 1240 nm) was used to increase the intraresonator intensity of the first-Stokes field, while M2 14 operated as the output coupler (OC) for both first- and second-Stokes. A separation of approximately 205 mm between M1 and M2 produced a resonator TEM$_{00}$ mode at the center of the diamond with a similar mode size to the focused pump. The system performance was improved such that the Raman resonator is synchronized with the pump laser 22. The resonator length was tuned by changing the position of M4 18 with a high precision translation stage. The resonator length detuning Δx was defined so that Δx=0 μm was the length that resulted in the lowest threshold of the first Stokes, with a positive (negative) Δx corresponding to a longer (shorter) resonator.

There are several advantages of using a ring resonator over standing-wave resonator, or linear resonator, particularly since the unwanted losses are mostly accounted for by scattering and surface losses associated with the diamond crystal 20. In a standing wave resonator, a Stokes field is predominantly amplified when traveling forward together with the pump pulse along the Raman crystal; the return pass through the crystal can provide a small level of additional gain if the (potentially strongly) depleted pump power is also returned from the end mirror, but at the expense of almost doubled round trip losses. A ring resonator design thus does not strongly reduce the round-trip Raman gain and can almost halve the round-trip losses compared to a standing-wave resonator. The synchronously pumped ring Raman laser 10 may provide unidirectional operation without requiring an intra resonator optical diode, owing to enhanced temporal overlap of the pump and co-propagating Stokes pulses through the crystal 20; this is discussed in more detail below. Finally, the ring optical resonator 10 gives little or no back-reflection to the pump laser system 22, avoiding the potential need for an isolator between the optical resonator 10 and the pump laser.

To generate first Stokes output, we built a low-Q first-Stokes optical resonator. The mirror M4$_1$ has a transmission T=8.3% at 1240 nm and is a light extractor for extracting light from the optical resonator (an "output coupler", abbreviated to "OC"). In an alternative embodiment, the mirror may be highly reflective, say >99%, as 1240 nm and the light extractor may be a dispersive element in the form of an optical prism. The first-Stokes (and second Stokes) field moved in a single sense in the optical resonator, ("unidirectional"), lasing in the "forward" direction defined as that co-propagating with the incident pump beam 24. The system 10 can lase in the backwards direction, as the underlying Raman gain coefficient is the same for forwards- and backwards-SRS in crystals. Geometric factors will in general favor forward operation: the overlap time for a 15 ps pump pulse and any point moving with the Stokes pulse envelope is 64 ps for a forward Stokes pulse (corresponding to the full 8-mm crystal length) but only 7.5 ps for a backwards-Stokes pulse (corresponding to the collision time of the pulses). We see then the geometry will strongly favor forwards operation unless the crystal length is significantly shortened.

FIG. 2 shows the first-Stokes threshold, output power and pulse duration as a function of optical resonator length detuning Δx, where the output power and pulse duration were measured at the maximum pump power of 4.8 W. First-Stokes output was obtained within a detuning range of Δx=−400 to +50 am. The minimum SRS threshold was 1.53 W at Δx=0 μm (by definition), where the maximum output power of 2.75 W at 1240 nm was also obtained. Power transfer data for Δx=0 μm is plotted in FIG. 3. We have achieved an overall conversion efficiency $\eta_o$=59%. Far above the SRS threshold (above 3.5 W pump power), the residual source light power ("pump power") started to clamp and the slope efficiency $\eta_s$ tended towards a limit of 76%; this is not far below the quantum limit of 86% for diamond indicating a very efficient laser. The beam quality factor $M^2$ for the 1240 nm output was measured to be 1.55 at the maximum output power.

The first-Stokes generation in this work is surprisingly efficient. The improvement is mainly attributed to the ring resonator configuration for the present work, as well as superior coatings for the mirrors 12, 14, 16, 18 and the crystal 20 used in this work. To indicate the significance of intraresonator losses affecting the laser performance, we used another diamond crystal having similar length (10 mm) and orientation but higher end-face reflectivity (R=0.4% per end-face, compared to R=0.06%), and obtained a reduced output power at 1240 nm of 2.1 W and $\eta_o$=43.8% (compared to 2.75 W and $\eta_o$=59%).

The pulse duration of the first-Stokes output was measured with an autocorrelator assuming that the pulses were Gaussian in time, and the measurement results are shown in FIG. 2 (*b*). The minimum pulse duration of 9 ps at 1240 nm was obtained at Δx=+50 μm. The effect of pulse-compression in this work is not particularly prominent because of the relatively short diamond crystal.

Figure 5:
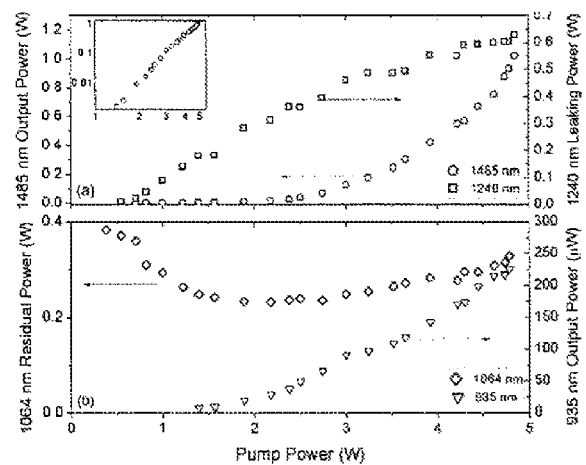
FIG. 5 shows another performance of the system of FIG. 1 as a function of a source light power.

To generate a radiating beam of Raman second Stokes light, the system 10 is operated with a different output coupler 18, M4$_2$, that had a HR coating at 1240 nm. With the round trip loss at 1240 nm from the mirrors dominated by the 0.4% transmission through M2, the intraresonator intensity of the first-Stokes field, monitored through the power leaking from M2, was significantly increased. The loss per resonance cycle of the Raman first Stokes is, in some embodiments, less than at least one of 5%, 2%, 1% and 0.5%. Increased losses can be compensated to some extent by increasing the source power, however the most efficient embodiments have reduced loss by, for example, selecting mirrors that are highly reflective at the Raman first Stokes and selecting a high quality nonlinear optical medium with low absorption and/or scattering losses. With this setup, we observed both forward generation of second-Stokes at 1485 nm, as well as backward generation of first-Stokes at 1240 nm in certain detuning regions. The performances of the second-Stokes and backward first-Stokes are summarised in FIG. 5, in which is shown (a) Second-Stokes (1485 nm) output power and first-Stokes (1240 nm) leaking power, (b) residual fundamental (1064 nm) power and anti-Stokes (935 nm) output power as a function of pump power at $\Delta x=0$ µm. The inset in (a) shows the second-Stokes output power vs. pump power in a log-log scales. The anti-Stokes power below 1.4 W of pump power was not measured owning to the limited sensitivity of the power meter used in the experiment.

We found that the system 10 could efficiently generate second-Stokes output, despite the fact that almost all of the second-Stokes radiation was lost from the resonator—only 0.02% of the second-Stokes power at the exit of the crystal circulated for the next round trip. Generally, embodiments extract from the optical resonator at least one of more than 50%, 86%, 90%, 95%, 96%, 97%, 98%, 99% and 100% of the power of the second Stokes power. The power may be extracted via at least one mirror, a dispersive element in the form of an optical prism, multiple mirrors, a mirror that transmits intra resonator light other than the intra resonator second stokes light, an optical nonlinear medium that a combination thereof or generally any suitable resonator configuration.

The system 10 performance as a function of $\Delta x$ is summarized in FIG. 4, showing that the second-Stokes 1485 nm was operating in a narrower $\Delta x$ region (from −105 µm to +22 µm) compared to the first-Stokes described in the previous section. The maximum output power was 1.02 W at $\Delta x=0$ µm with 4.8 W pump power, corresponding to ~21% overall conversion efficiency. The system 10 output pulse duration was around 10 ps for most of the negative $\Delta x$ resonator detuning range and dropped steeply for positive detuning. The shortest pulse duration was 6 ps at $\Delta x=+20$ µm. The measured beam quality factor $M^2$ was ~2.2 for the maximum output power.

The generation of the Raman second Stokes light is initiated by a four wave ("parametric") mixing process. The four wave mixing process is generally not phase matched. Because the four wave mixing is not generally phase matched, the four wave mixing process generally generates a very week light of little or no practical power at the frequency of the second stokes, which is a seed light. The second-Stokes wave experiences SRS gain pumped by the Stokes field. In our view, the parametric generation of second-Stokes seeds the SRS process. This is a single-pass process. This view is also supported by the threshold-less behaviour of the second-Stokes, seen clearly in the inset of FIG. 5*a*.

In this embodiment, the combination of four wave mixing (FWM) and single-pass SRS for generating the second-Stokes output is very simple and efficient. It doesn't require a mirror to be designed for the second-Stokes wavelength, and does not require compensation of dispersion introduced by the optical resonator and the Raman crystal.

We can analyse the second Stokes seed power generated by four-wave-mixing. Coherent scattering to generate second Stokes obeys the rate equation for growth with propagation distance z:

$$dE_{SS}/dz = 1/2 g_{SS} E^*_L E_S^2 e^{-i\Delta k_{SS} z} \quad (1)$$

where E is proportional to the field amplitude such that as $I=|E|^2$ and the L, S, and SS subscripts refer to the laser, first Stokes, and second Stokes respectively. The second Stokes gain coefficient $g_{SS}=g_S\omega_{SS}/\omega_S$ where $g_S$ is the Stokes Raman gain coefficient, and $\omega$ refers to the fields' angular frequency.

We can integrate (1), do some trigonometry, square to get intensity, and convert to powers, to get $$P_{SS} = \frac{g_{SS}^2 P_L P_S^2}{A^2 \Delta k_{SS}^2} \sin^2(\Delta k_{SS} \cdot z/2) \quad (20)$$

in which A is the beam area. This is the equation that gives a sine-like creation and destruction of second Stokes by FWM where there is a phase mismatch. SRS will amplify the second Stokes seed break the symmetry of creation and destruction, giving high power output. The seeding of the second Stokes by FWM, up to a maximum value of $g_{SS}^2 P_L P_S^2 / A^2 \Delta k_{SS}^2$ means that no cavity feedback is required to obtain second Stokes output. No second Stokes threshold will be observed since second Stokes is generated whenever the first Stokes is present, and as the second Stokes SRS single-pass gain increases we expect the second Stokes power to rapidly increase.

For the present laser, we can estimate the strength of the four wave mixing seed. Using Sellmeier coefficients from F. Peter, Z Phys 15, 358 (1923), we can calculate $\Delta k_{SS}=6857$ m$^{-1}$ for mixing 1064 and 1240 nm to make 1485 nm second Stokes. For a laser power of 3 W (average power), we can estimate a resonated first Stokes power of 100 W. The peak powers during each pulse are approximately 1000 times higher than the average powers. For a 30 micron focal waist, we can calculate that the average power of the second Stokes seed is 200 mW.

We can then consider what values of resonator reflectivity for second Stokes are likely to be insignificant. For a laser generating 1 W of output power at second Stokes and with a second Stokes output coupling fraction T, the resonated second Stokes power at the start of each gain pass is $(1−T)/T$. For T>83%, this will be less than the 200 mW second Stokes seed, and we can consider the laser to be operating in the 'seeded non-resonating' mode. In some embodiments, the 'seeded non-resonating' mode may occur for T>50%, or T>86% or greater, for example.

Note that for longer wavelengths (e.g. generating second Stokes from a 2128 nm laser), the mismatch is less ($\Delta k_{SS}=2800$ m$^{-1}$ for generating 4919 nm from 2128 and 2970 nm) and so will more than offset the ≈0.5 factor reduction in $g_{SS}$ moving to this wavelength range (gain is approximately inversely proportional to wavelength). Seeding will thus be even stronger for longer wavelength versions of this laser, or for cascaded lasers where several Stokes orders are resonated before a final non-resonated output is generated. With the high-Q resonator used for second-Stokes operation, backwards propagating first-Stokes output was also obtained for small positive length detuning of $\Delta x=0$ to +55 µm. The output power and threshold for the backward first-Stokes output as a function of $\Delta x$ are characterized in FIGS. 4(*a*) and 4(*d*) respectively. The maximum output power for the backward 1240 nm was 0.45 W at $\Delta x=+27$ µm. The pulse duration along the whole operating region was >30 ps, limited by the scanning range of the autocorrelator, much longer than that for the forward first-Stokes.

In general, the forward SRS operates best for resonator lengths that are matched, or a little shorter that the pump laser (negative detuning), as shown in FIG. 2 and FIG. 3. For negative detuning's, to be maintained in steady state the Stokes pulse must be preferentially amplified in its tail to reshape the pulse to cause an effective delay, counteracting the fact that it is advanced on each round trip owing to the resonator length mismatch. Preferential amplification of the tail is consistent with transient Raman scattering, and so negative detuning can be tolerated. Positive detuning on the other hand required preferential amplification of the leading edge of the Stokes pulse: this is not easily achieved and forward-Stokes operation is not possible for significant positive detuning.

Efficient operation of forward-Stokes leads to strong depletion of the pump field as shown in FIG. 3 and FIG. 4*b*, and so backward-Stokes operation does not reach its threshold. In the positive detuning region however, forward operation is suppressed, and now backward-Stokes operation does indeed reach threshold. The pulse forming dynamics for the colliding pump and Stokes fields for this mode of operation clearly permit a greater degree of positive detuning, and in this window of suppressed forward operation, the backward operation can dominate.

The system 10 may be forced to operate in the pure backward direction, for example by introducing an intraresonator optical isolator to prevent the forward Stokes field from oscillating.

In summary, disclosed herein is a highly efficient picosecond system operating at both 1240 nm and 1485 nm. Up to 2.75 W output power and 59% conversion efficiency were achieved for the first-Stokes 1240 nm in a low-Q optical resonator. The slope efficiency tended towards 76% when the pump was far above the SRS threshold. The second Stokes 1485 nm was generated simply through FWM and single-pass SRS in a high-Q optical resonator 10 with very high per resonance cycle loss for the Raman second stokes. Up to 1.02 W output power at 1485 nm was generated with 21% overall conversion efficiency. The system has may have potential in power scaling for the Stokes generation owning to the high slope efficiency far above the SRS threshold and to the superior thermal properties of diamond.

Another embodiment of the system and method uses a dispersive element in the form of a prism (or generally any suitable dispersive element, for example a grating) to extract the amplified seed light from the resonator. The dispersive element is placed in the path of the amplified seed light within the resonator. The dispersive element bends the amplified seed light beam away from a resonator mirror such that the amplified seed light beam does not make a circuit of the resonator. That is, excepting any absorption or scattering, all of the power of the amplified seed light is extracted from the optical resonator. In this embodiment, the amplified seed light is not resonated within the resonator.

In yet another embodiment, the resonator is configured for generation of the source light within the resonator. For example, this other embodiment may comprise an original light source in the form of a mode locked laser external of the resonator. The mode locked laser may be arranged to generate an original light in the form of a train of original light pulses. The original light source and the resonator are arranged such that the original light when generated is received by the nonlinear optical medium to generate a Raman first Stokes to the original light. The resonator is configured to resonate the Raman first Stokes. The resonator may be configured to resonate higher order Raman Stokes to the original light. Consequently, for example, the source light may be a Raman first Stokes, or high order Raman Stokes, of the original light.

Variations and/or modifications may be made to the embodiments described without departing from the spirit or ambit of the invention. The nonlinear optical medium may generally be any suitable nonlinear optical medium—not only diamond—examples of which include $LiNbO_3$, KGW, $YVO_4$, $Ba(NO3)_2$, and $BaWO_4$. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method for generating a Raman second Stokes light from a source light, the method comprising the steps of:
   generating a Raman first Stokes light from the source light by a Raman interaction in a nonlinear optical medium disposed in an optical resonator, and resonating the Raman first Stokes light in the optical resonator;
   generating a seed light at the frequency of the Raman second Stokes light by a four wave mixing process between the source light and the Raman first Stokes light in the nonlinear medium wherein the source light and the Raman first Stokes light are not phase matched;
   amplifying the seed light by transferring power from the first Stokes light resonating in the optical resonator to the seed light using stimulated Raman scattering in the nonlinear medium to produce the Raman second Stokes light; and
   extracting from the optical resonator a majority of the Raman second Stokes light.

2. A method defined by claim 1 and wherein the source light comprises a plurality of source light pulses, the Raman first Stokes light comprises a plurality of Raman first Stokes pulses, and the seed light comprises a plurality of seed light pulses.

3. A method defined by claim 2 wherein each of the plurality of source light pulses has a temporal width of less than at least one of 10 ns, 1 ns, 100 ps, 10 ps and 1 ps.

4. A method defined by claim 2 wherein the plurality of source light pulses are spatially coincident with the plurality of Raman first Stokes pulses and the plurality of seed light pulses within the nonlinear optical medium.

5. A method defined by claim 2 wherein the plurality of light source pulses are generated by a mode locked laser.

6. A method defined by claim 1 wherein the nonlinear optical medium comprises a diamond crystal.

7. A method defined by claim 1 wherein the source light, the Raman first Stokes light, and the seed light propagate in a <110> direction of the diamond crystal; and wherein the source light is polarized in the <111> direction of the diamond crystal.

8. A method defined by claim 1 wherein the Raman first Stokes light has a single sense of movement within the optical resonator.

9. A method defined by claim 1 wherein resonating the Raman first Stokes light in the optical resonator comprises the step of the losing less than at least one of 5%, 2%, 1% and 0.5% of the power of the Raman first Stokes light per resonance cycle; and wherein the method comprises the step of extracting from the optical resonator at least one of 83%, 90%, 95%, 96%, 97%, 98%, 99% and 100% of the power of the seed light so amplified.

10. A system for generating a Raman second Stokes light from a source light, the system comprising:

an optical resonator having disposed therein a nonlinear optical medium for receiving the source light, the optical resonator inducing a plurality of mirrors configured to resonate a Raman first Stokes light generated by a Raman interaction of the source light when so received by the nonlinear medium, the nonlinear medium being able to support therein a four wave mixing process between the Raman first Stokes light when so generated and the source light wherein the Raman first Stokes light and the source light are not phase matched, the four wave mixing process generating a seed light at the frequency of the Raman second Stokes light the nonlinear medium being able to support therein stimulated Raman scattering to amplify the seed light when so generated by transferring power from the Raman first Stokes light to the seed light to produce the Raman second stokes light; and a light extractor arranged to extract from the optical resonator a majority of the power of the Raman second Stokes light, wherein the light extractor includes one or more of:

at least one of the plurality of mirrors;

an optical prism; or a dispersive element.

11. A system defined by claim 10 wherein the light extractor comprises at least one mirror that transmits more than 83% of the power of the seed light so amplified.

12. A system defined by claim 10 comprising a source arranged to generate the source light, the source being arranged to generate a plurality of source light pulses, the Raman first Stokes light when so generated comprises a plurality of Raman first Stokes light pulses, and the seed light when so generated comprises a plurality of seed light pulses.

13. A system defined by claim 12 wherein each of the plurality of source light pulses has a temporal width of less than at least one of 10 ns, 1 ns, 100 ps, 10 ps and 1 ps.

14. A system defined by claim 13 wherein the optical resonator has a length such that the plurality of source light pulses are spatially coincident with the plurality of Raman first Stokes pulses and the plurality of seed light pulses within the nonlinear optical medium.

15. A system defined by claim 13 wherein the source of the source light comprises a mode locked laser generating the plurality of source light pulses.

16. A system defined by claim 10 wherein the nonlinear optical medium comprises a diamond crystal.

17. A system defined by claim 16 wherein the optical resonator and the diamond are arranged such that the source light, the Raman first Stokes light, and the seed light propagate in a <110> direction of the diamond crystal; and wherein the source light is polarized in the <111> direction of the diamond crystal.

18. A system defined by claim 10 wherein the optical resonator is not linear.

19. A system defined by claim 10 wherein the optical resonator is configured for less than at least one of 5%, 2%, and 1%, 0.5% loss of the power of the Raman first stokes light per resonance cycle, and wherein the light extractor is arranged to extract from the optical resonator at least one of 86%, 90%, 95%, 96%, 97%, 98%, 99% and 100% of the power of the seed light so amplified.

* * * * *